Sept. 13, 1938.   H. A. KNOX   2,129,696
TRACK FOR TRACK LAYING VEHICLES
Filed June 12, 1935
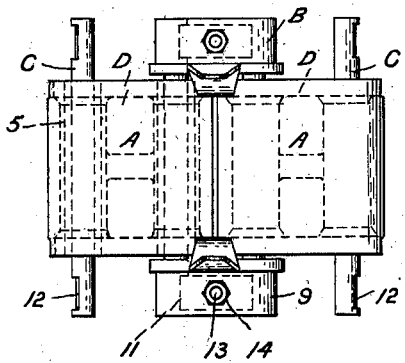
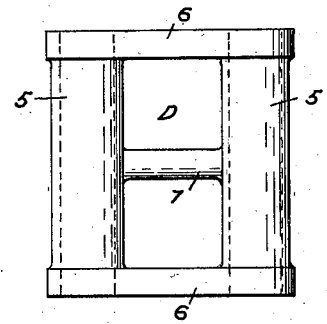
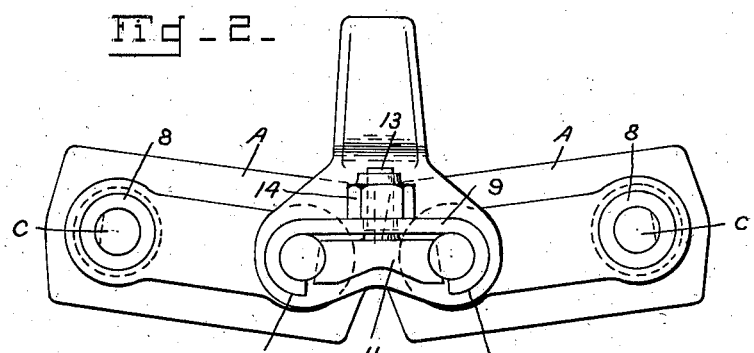
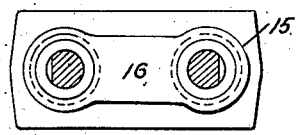
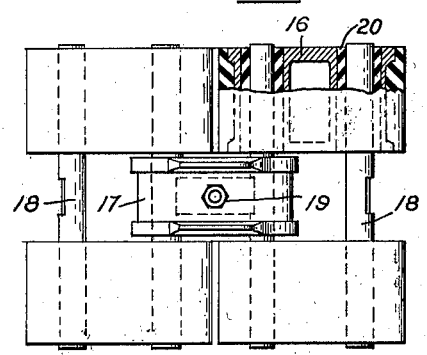
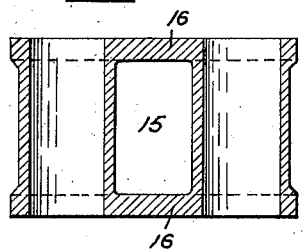
Inventor
Harry A. Knox
By W. N. Roach
Attorney Patented Sept. 13, 1938

2,129,696

UNITED STATES PATENT OFFICE 2,129,696

TRACK FOR TRACK-LAYING VEHICLES

Harry A. Knox, Washington, D. C.

Application June 12, 1935, Serial No. 26,194

2 Claims. (Cl. 305—10)

(Granted under the act of March 3, 1883, as amended April 30, 1928; 370 O. G. 757)

The invention described herein may be manufactured and used by or for the Government for governmental purposes, without the payment to me of any royalty theeron.

This invention relates to a track for track-laying vehicles.

The purpose of the invention is to provide a track of the rubber shoe type in which the track tension is transmitted through rigid elements.

A further object is to facilitate construction of the track shoe by providing a rigid insert for a rubber shoe which includes and correctly spaces bearings or sleeves for the link pins.

To these and other ends, the invention consists in the construction, arrangement and combination of elements described hereinafter and pointed out in the claims forming a part of this specification.

A practical embodiment of the invention is illustrated in the accompanying drawing, wherein:

Fig. 1 is a plan view of a portion of the lower flight of a track constructed in accordance with the invention.

Fig. 2 is a view in side elevation.

Fig. 3 is a plan view of the rigid insert.

Fig. 4 is a view in side elevation of a shoe, the link pins in section.

Fig. 5 is a plan view partly in section of a double-row track.

Fig. 6 is a sectional view of a modified insert employed in the track of Fig. 5.

Referring to Figs. 1 to 4, the track comprises a row of shoes A connected in spaced relation by rigid links B mounted on link pins C extending transversely through opposite ends of the shoes.

The shoes A are all identical and each consists of a block of rubber or similar material having a rigid insert or frame D, preferably of metal. The frame comprises a pair of spaced, parallel bearings or sleeves 5—5 connected at their ends by side webs 6—6 and optionally connected at their intermediate portions by one or more webs 7. The rubber vulcanized to the frame to form the shoe, covers all of the frame except the outer faces of the sleeves 5 and the outer faces of the side webs 6—6. Each of the sleeves 5 carries a rubber bushing 8 whose outer surface is fixed to the sleeve and whose inner surface is fixed to the link pin C.

The links B are all identical and each one is mounted on adjoining link pins of adjacent shoes. The link includes a flange 9 having turned ends 10—10 adapted to hook over the link pins. A bolt insertable between the link pins has a wedge-shaped head 11 receivable in grooves 12 in the link pins. The shank 13 of the bolt passes through the flange 9 and receives a nut 14. This connection holds the link in place and locks the associated link pins against independent rotational movement.

By virtue of this construction the track tension is taken by the metal parts except for the small amount of rubber in the bushing 8. The frame D also maintains the shoe against bending and greatly facilitates construction of the shoe in that the bearings or sleeves 5—5 are held by the webs in correctly spaced position.

In the modification shown in Figs. 5 and 6 the frame 15 is provided only with side webs 16. This arrangement is used when the shoes are relatively narrow and are to be used in a double-row track. The links 17 are formed to hook over adjoining link pins 18 of adjacent shoes and are held in place by the bolt 19 in the manner previously described. The link pins 18 are each fixed in a rubber bushing 20.

I claim:

1. A track for track-laying vehicles embodying a series of spaced shoes; each shoe consisting of a rigid rectangular frame of spaced sleeves connected at their ends by webs, a block of rubber vulcanized around the frame; and a rubber bushing fixed in each sleeve; a link pin passing through and fixed in each bushing, and a rigid detachable link connecting adjoining pins of adjacent shoes, spaced from the shoes and immovable angularly and longitudinally with respect to the pins.

2. A track for track-laying vehicles embodying a series of spaced shoes; each shoe consisting of a block of rubber having a rigid rectangular metal frame insert including spaced sleeves, and a rubber bushing fixed in each sleeve; a link pin passing through and fixed in each bushing, and a rigid detachable link connecting adjoining pins of adjacent shoes, spaced from the frame and immovable with respect to the pins.

HARRY A. KNOX.